United States Patent [19]
Potes et al.

[11] Patent Number: 5,470,220
[45] Date of Patent: Nov. 28, 1995

[54] FLEXIBLE PART DEFLASHER

[75] Inventors: Michael M. Potes, Adrian; Edwin H. Lambarth, Onsted; Troy A. Frasher, Munith; Beth E. Edelstein, Ann Arbor; Lowell D. Kelley, Tecumseh, all of Mich.; Cynthia J. Lewis, Toledo, Ohio

[73] Assignee: Hoover Universal, Inc., Plymouth, Mich.

[21] Appl. No.: 79,434

[22] Filed: Jun. 17, 1993

[51] Int. Cl.[6] .................................................. B24B 9/00
[52] U.S. Cl. .......................... 425/216; 83/914; 225/93; 264/161; 264/162; 425/289; 425/806; 425/DIG. 51
[58] Field of Search .................................... 425/215, 216, 425/385, 394, 397, 402, 403.1, 806, 789; 225/93, 103; 83/914; 264/161, 162

[56] References Cited

U.S. PATENT DOCUMENTS

| | | |
|---|---|---|
| 2,088,876 | 8/1937 | Spanel ............................... 225/93 |
| 3,695,109 | 10/1972 | Uhlig. | |
| 3,901,637 | 8/1975 | Eggert. | |
| 4,310,112 | 1/1982 | Huss ................................ 425/806 |
| 4,548,574 | 10/1985 | Badalamenti et al.. | |
| 4,894,958 | 1/1990 | Takasaki ........................... 425/806 |
| 5,118,276 | 6/1992 | Hashimoto ........................ 425/289 |

Primary Examiner—Jay H. Woo
Assistant Examiner—Joseph Leyson
Attorney, Agent, or Firm—Leonard Kalinowski; E. L. Levine; Joseph E. Root, III

[57] ABSTRACT

Apparatus for removing flash from a flexible molded part includes a support for supporting the part being deflashed in underlying relation with first and second pinch rollers which are located at opposite ends of the part, and first and second conveyor assemblies associated with the first and second pinch rollers, respectively, are adapted to move the flash at both ends of the part into engagement with the pinch rollers which are driven in opposite directions and have knurled surfaces, causing the flash to be pinched between the pinch rollers and the associated conveyor assemblies, pulling the flash from said part, the conveyor assemblies conveying the flash away from part.

8 Claims, 4 Drawing Sheets

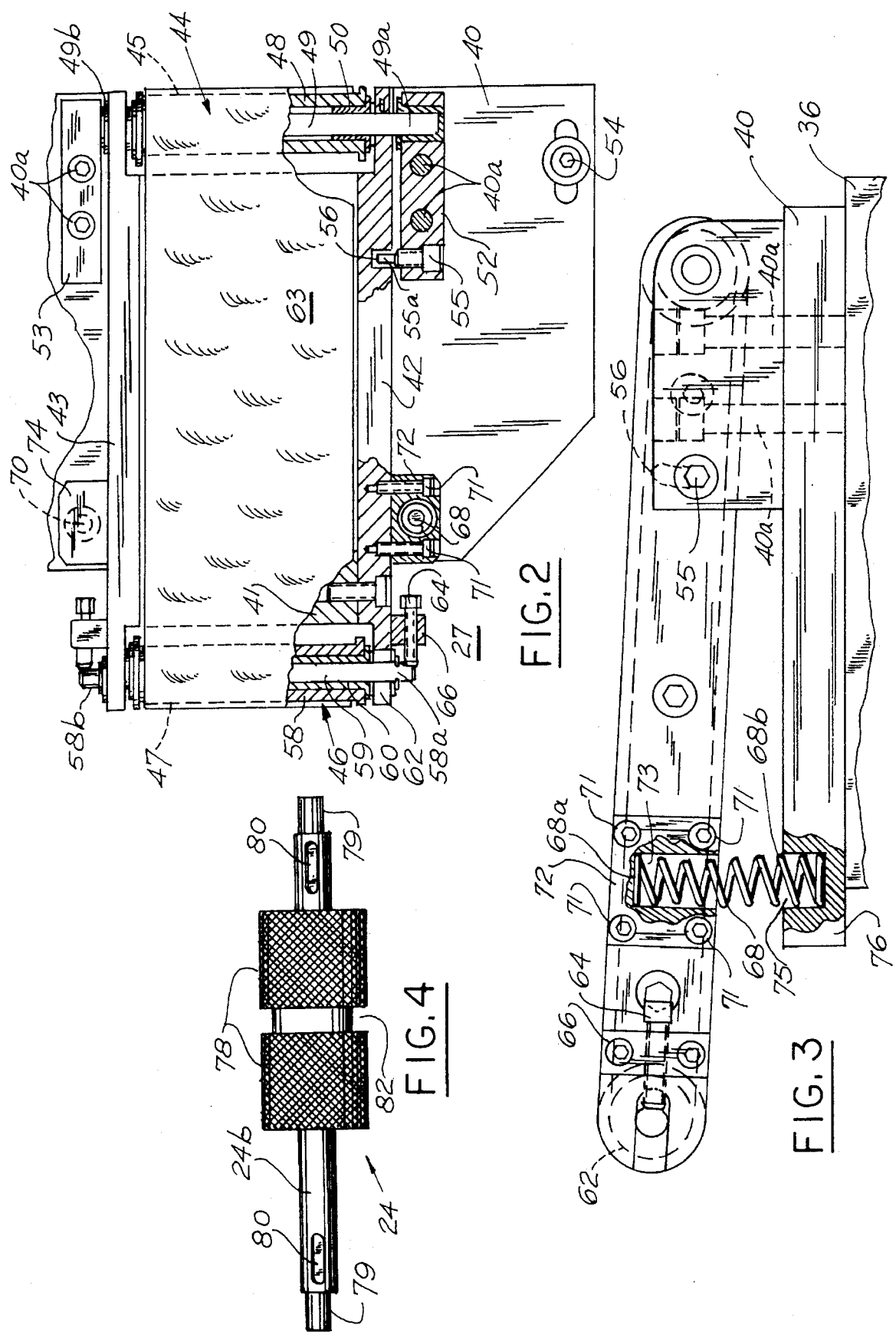

FLEXIBLE PART DEFLASHER

BACKGROUND OF THE INVENTION

This invention relates to the production of molded parts or articles, and more particularly, to apparatus and a method for removing scrap waste material or flash material from molded parts or articles.

Parts or articles which are produced by molding generally include scrap waste material, referred to as flash material, which must be removed from the part after the part has been molded. In some processes, the flash is removed as the part is being removed from the mold. In such processes, the flash removal is accomplished using a mechanism, commonly referred to a tail puller, which grips the flash material and causes it to be pulled off the part as the part is being removed from the mold.

In other processes, the parts are molded singularly and the flash is removed from the molded part after it has been removed from the mold. In automated processes, the molded part is removed from the mold and placed on an indexing unit which indexes the part with a trim station where the flash material is removed. Various techniques have been devised for removing flash material from molded parts in automated systems. Typically, the flash is knocked off the part, particularly when the part is rigid. Alternatively, the flash may be removed using sharp cutting surfaces or knives for cutting the flash from the part or article. The knives are held fixed relative to the cutting apparatus while the flash is cut or scraped from the part. In both cases, the part must be held firmly during the deflashing operation, and so neither of these techniques works effectively when the part or article being deflashed is flexible or is made of a relatively thin material. Moreover, these prior art processes do not provide an effective way for conveying the flash away from the mold or the cutting mechanism after it has been removed from the part, an important consideration when the flash removal process is automated and continuous.

SUMMARY OF THE INVENTION

The present invention provides an apparatus and method for removing flash from molded parts or articles, and in particular for removing flash from flexible parts or articles or parts or articles which are made of a thin material. The deflashing apparatus includes at least one, and preferably two pinch rollers which are spaced apart from one another and are located at opposite ends of the part being deflashed. The pinch rollers, which have knurled surface portions, are rotated in opposite directions and in a direction outwardly or away from the part being deflashed. The part to be deflashed is positioned with its flash containing portions, typically the ends of the part, in underlying relation with the pinch rollers. An engaging means is then actuated to move the flash bearing portions of the part into engagement with the rotating pinch rollers. The engaging means pinches the scrap or flash between the engaging means and the rotating pinch rollers which pull the flash from the part at both ends of the part.

In accordance with a disclosed embodiment, the engaging means comprises two free moving conveyor assemblies which are located at opposite ends of the part being deflashed. Each of the conveyor assemblies has a fixed end which is pivotally mounted to a support and a movable end which rests on a compression spring which extends between the support and the movable end of the conveyor assembly. The support lifts the conveyor assemblies vertically upward into operative relation with the pinch rollers. The movable ends of the conveyor assemblies pinch the flash between the movable ends of the conveyor assemblies and the knurled surface portions of the pinch rollers, causing the flash to be pulled from the part by the pinch rollers. The flash which is removed from the part is carried away by the free moving conveyor assemblies which are driven by the pinch rollers when the conveyor assemblies engage the pinch rollers during the deflashing operation.

The part deflashing apparatus provided by the present invention is particularly suited for deflashing flexible parts or articles or thin walled parts or articles of the type that would tend to collapse when engaged by a cutting or scraping mechanism. Such parts or articles are difficult to hold using known deflashing apparatus.

The deflashing apparatus is adapted for a continuous feed process and includes a mechanism for transporting the molded parts or articles from the molding apparatus to the deflashing apparatus. The deflashing apparatus operates in synchronism with the part transporting mechanism such that the conveyor assemblies are articulated up and down as each part to be deflashed is positioned beneath the pinch rollers.

The invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE DRAWINGS

FIG. 2 is a top plan view, partially cut away, of one of the conveyor assemblies of the deflashing apparatus of FIG. 1, the other conveyor assembly being a mirror image of the conveyor assembly shown in FIG. 2;

FIG. 3 is a side elevation view of the conveyor assembly shown in FIG. 2, partially cut away to illustrate the compression spring mechanism;

FIG. 4 is a plan view of one of the pinch rollers of the deflashing apparatus of FIG. 1;

DESCRIPTION OF A PREFERRED EMBODIMENT

Figure 1:
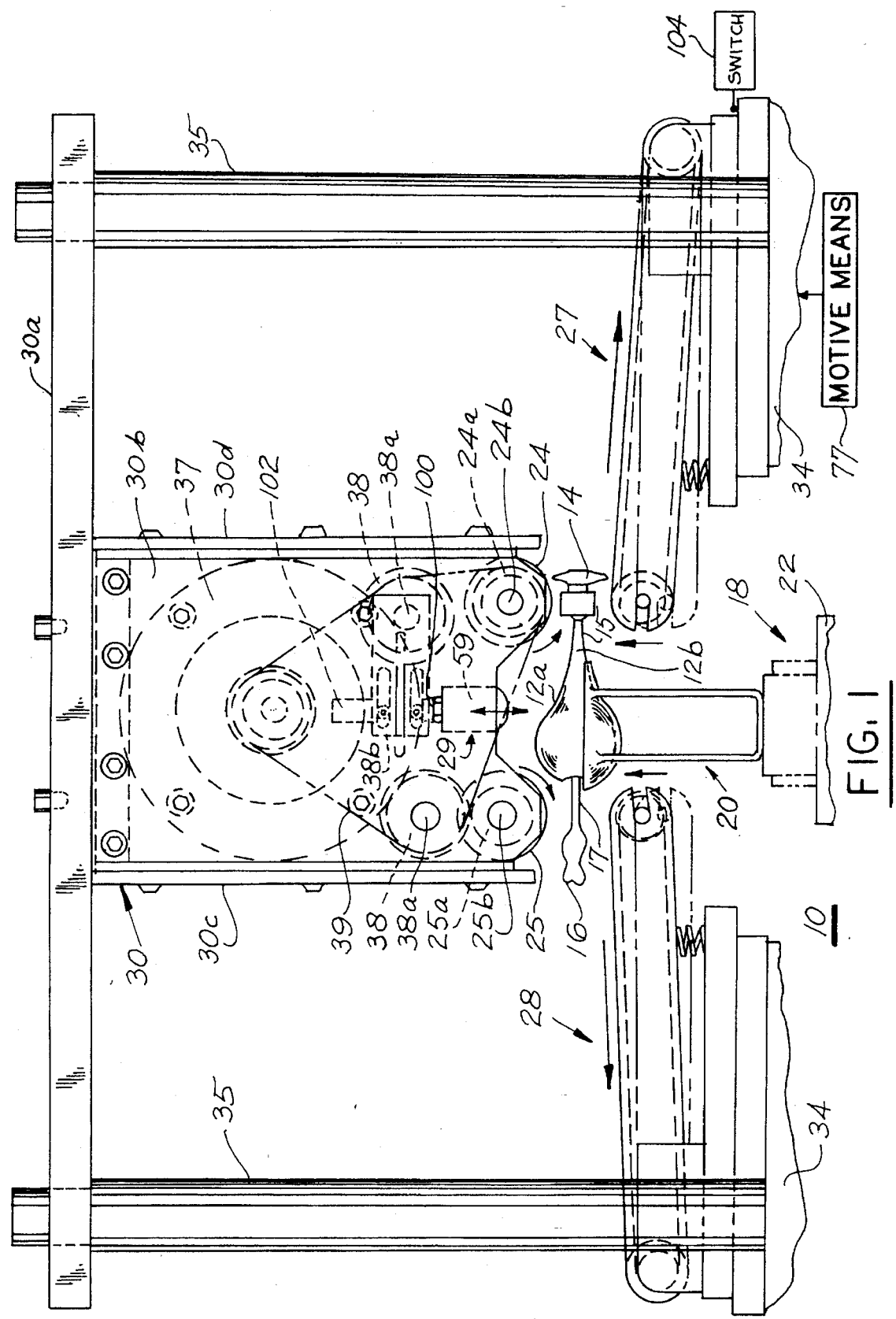
FIG. 1 is a side elevation view of the deflashing apparatus provided by the present invention.

Referring to FIG. 1, the deflashing apparatus 10 provided by the present invention is described with reference to an application for removing flash material from the ends of a part 12 which has been made by a blow molding process. In the exemplary embodiment, the part 12 being deflashed is a bulb syringe which has a squeezable bulb portion 12a which tapers to form a narrow tube or nozzle 12b at one end of the part. As the part comes out of the mold, it has flash material 14 at one end 15 and flash material 16 at the other end 17. The part 12 is conveyed to the deflashing apparatus 10 by a transport mechanism 18 including a part support 20 which is mounted on and moved by a moving carriage 22. The part support 20 positions the part 12 in operative relation with a pair of pinch rollers 24 and 25 and a pair of conveyor assemblies 27 and 28 of the deflashing apparatus 10. The carriage 22 includes a plurality of part supports 20 and moves parts into operative relation with the pinch rollers and conveyor assemblies of the deflashing apparatus 10 at a "stop and start" feed rate which is coordinated with the operating cycle of the deflashing apparatus 10, typically 1 to 2 seconds. A part holder 29 holds the part 12 firmly in place in the support 20 during the deflashing operation.

The deflashing apparatus 10 includes a fixture 30 which supports two pinch rollers 24 and 25 above the article or part 12 being deflashed. The fixture 30 includes a top panel 30a, a front panel 30b, side panels 30c and 30d and a back panel (not shown), which is a mirror image of the front panel in size and shape. The fixture 30 is supported on a base 34 by four upright shafts, such as upright shafts 35 shown in FIG. 1. The upright shafts serve as guides for a movable platen 36 which raises and lowers the conveyor assemblies 27 and 28 during the deflashing operation. The fixture 30 mounts a drive motor 37 and tension pulleys 38 mounted on shafts 38a which are journaled in the front and back panels of the fixture. The pinch rollers 24 and 25 include respective drive pulleys 24a and 25a which are coupled to the drive shaft of the motor by a timing belt 39 which extends around the drive pulleys 24a, 25a and the tension pulleys 38 in a manner as to cause the two pinch rollers 24 and 25 to be rotated in opposite directions and turn away from the part 12. One of the tension pulleys is mounted on movable plate 38b to permit adjustment of the belt tension. The pinch rollers 24 and 25 include shafts 24b and 25b which are journaled in the front and rear panels.

The part support 20 for the blow molded part or article 12 supports the part with the flash extending beyond the support structure. The pinch rollers 24 and 25 are located above the part 12 being deflashed at both ends of the part and just above the surface of the flash bearing portions of the part 12. One of the conveyor assemblies 27 is associated with pinch roller 24 and is located at one end 15 of the part 12 being deflashed. The other conveyor assembly 28 is associated with pinch roller 25 and is located at the other end 17 of the part 12. The conveyor assemblies act as a bias means for urging the flash into engagement with the pinch rollers, enabling the pinch rollers, which are turning in opposite directions, to pull the flash from the part.

Referring to FIGS. 2 and 3, the conveyor assembly 27 includes a base member 40, a spacer 41 and a pair of side frame members 42 and 43 which are assembled together, defining a frame for the conveyor assembly. A pivoting cylinder assembly 44 is mounted at the fixed end 45 of the conveyor assembly and a take up cylinder assembly 46 is mounted at the movable end 47 of the conveyor assembly. The pivoting cylinder assembly 44 includes a roller 48, a shaft 49 and a bushing 50 which connects the shaft 49 to the roller 48. The shaft 49 has one end 49a journaled in a pivot bracket 52 and the other end 49b journaled in a pivot bracket 53. The pivot brackets 52 and 53 are mounted on the base member 40 and secured thereto by suitable fasteners 40a on opposites sides of the base member 40. The base member 40 is mounted on the movable support or platen 36 and secured thereto by suitable fasteners 54. The pivot bracket 53 includes a pin 55 having a shank portion 55a which is received in an arcuate slot 56 in the side frame member 42 defining an upper and lower pivot travel limit for the conveyor assembly 27.

Similarly, the take-up cylinder assembly 46 includes a roller 58, a shaft 59 and a bushing 60 which connects the shaft 59 to the roller 58. The ends 59a and 59b of the shaft 59 of the take-up cylinder assembly 46 are received in a grooves 62 in the front edge of the side frame members 42 and 43. The shaft 59 is urged forward by screws 64 which are threadingly received in screw blocks 66 which are secured to the side frame members 42 and 43 at their ends, just rearwardly of the grooves 62.

The conveyor assembly 27 includes a continuous conveyor belt 63 which extends around the pivot roller 48 and take-up roller 58. The take up cylinder assembly 46 is adjusted by advancing screws 64 against the shaft 59 until the conveyor belt 63 is tight. The conveyor assembly conveys the flash removed from the part away from the part. The conveyor assembly 27 may include vertically extending side plates (not shown) secured to the side frame members on both sides of the conveyor belt to maintain the scrap on the conveyor belt as it is conveyed away from the part.

The end of the conveyor assembly 27 is pivotally mounted, permitting the conveyor assembly to swivel or rotate about the fixed end. A pair of compression springs 68 and 70 are mounted in respective spring blocks 72 and 74 which are secured by fasteners 71 to the side surface of the side frame members near the movable front end of the conveyor assembly. Each compression spring, such as compression spring 68 has an upper end 68a located in a downwardly opening aperture 73 in the lower surface of the associated spring block 72. The lower end 68b of the compression spring 68 is received in aperture 75 in the forward end 76 of the base member 40. The compression springs bias the movable end of the conveyor assembly 27 upwards while permitting the movable end to pivot downward against the spring force when it moves the flash of part 12 into engagement with the pinch roller 24 during the deflashing operation.

The conveyor assembly 28 which is associated with pinch roller 25 is identical in structure to, but a mirror image of, conveyor assembly 27 and operates in the manner of conveyor assembly 27, but in association with pinch roller 25 at end 17 of the part. Accordingly, conveyor assembly 28 will not be described in detail, and in the drawings, elements of conveyor assembly 28 have been given the same reference numerals as like elements of conveyor assembly 27, but with a prime notation.

Referring to FIG. 1, the conveyor assembly 27 and the conveyor assembly 28 are mounted on a movable platen 36. The platen 36 is driven vertically up and down by a suitable motive means 77, which moves the two conveyor assemblies carried by the platen 36 into operative relation with the associated pinch rollers 24 and 25.

Figure 6:
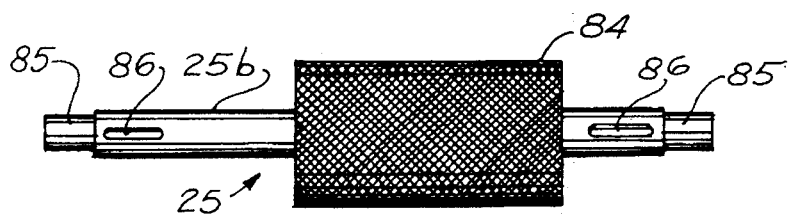
FIG. 6 is a plan view of the other pinch roller of the deflashing apparatus of FIG. 1.

Referring to FIGS. 4 and 6, pinch roller 24 has a knurled outer surface 78 and a shaft 24b having ends 79. A keyway 80 is provided at each end to facilitate an indexed connection of the shaft 24b of the pinch roller 24 to the drive pulley 24a (FIG. 1) at either end of the shaft. The pinch roller 24 has a circumferential groove 82 near its center to accommodate the nozzle or tip of the part 12 being deflashed. Similarly, pinch roller 25 has a knurled outer surface 84 and a shaft 25b having ends 85. A keyway 86 is provided at each end to facilitate an indexed connection of the shaft 25b of the pinch roller 25 to the drive pulley 25a (FIG. 1) at either end of the shaft.

Referring now to FIGS. 8–11, the part support 20 includes a shallow cup-shaped upper portion 90 which is supported on U-shaped legs 91 including parallel plate members 92 and 93 which are rectangular in shape and are joined by a rectangular, horizontally extending lower web 94. The lower web 94 has an aperture 95 at one end and an open ended notch 96 at the other end to facilitate mounting of the part support 20 on the upper surface of the transport mechanism 18 (FIG. 1). The length of the legs 91 is selected to locate the part just below the pinch rollers as illustrated in FIG. 1.

Figure 9:
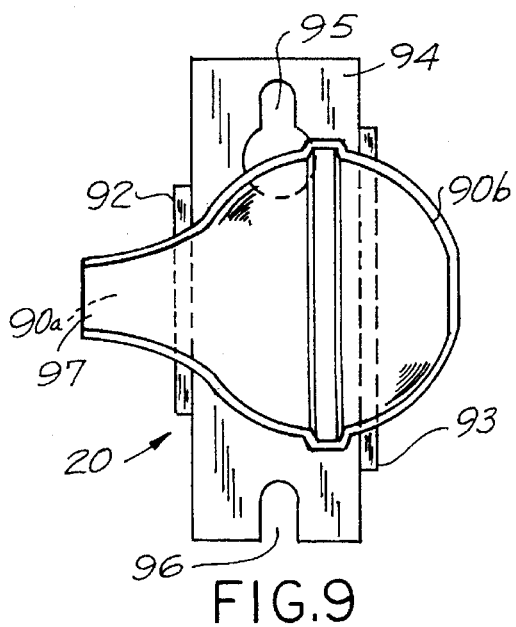
FIG. 9 is a top plan view of the part support.
Figure 10:
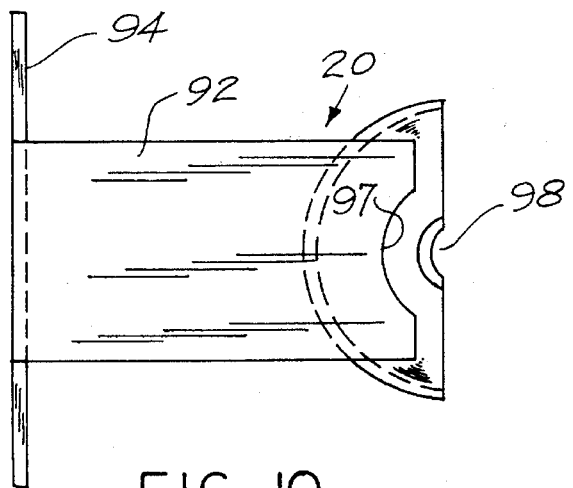
FIG. 10 is an elevation view of the one side of the part support.
Figure 11:
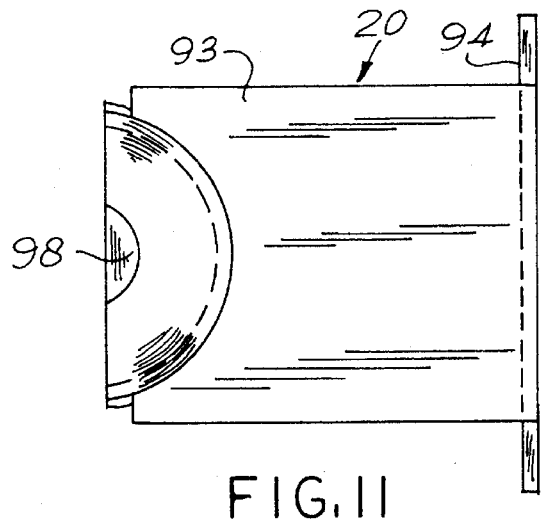
FIG. 11 is an elevation view of the other side of the part support.

The shape of the upper portion 90 of the part support is tailored to the shape the part 12 being deflashed. In the exemplary embodiment illustrated in FIG. 1, wherein the part 12 being deflashed has a squeezable bulb portion 12a which tapers to form a narrow tube or nozzle 12b at one end 15, the periphery of the cup-shaped upper portion 90 is somewhat pear shaped as shown in FIG. 9. The cup portion 90 is necked-down at one end 90a defining an arcuate support 97 region which supports the nozzle or tip portion 12b of the part 12 during the deflashing operation. The other end 90b of the cup portion 90 has a small radius notch 98 providing clearance for the flash 16 at end 17 of the part 12.

Figure 5:
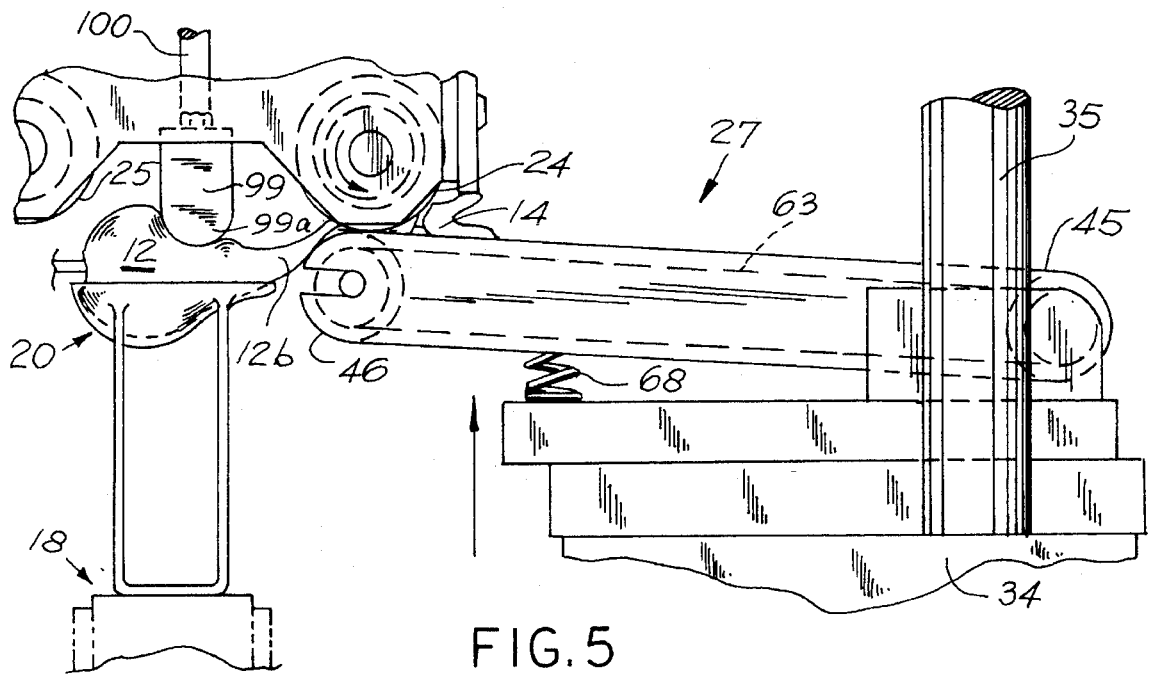
FIG. 5 is a simplified view illustrating one of the conveyor assemblies in its operative relation with the associated pinch roller which is shown in FIG. 4.
Figure 7:
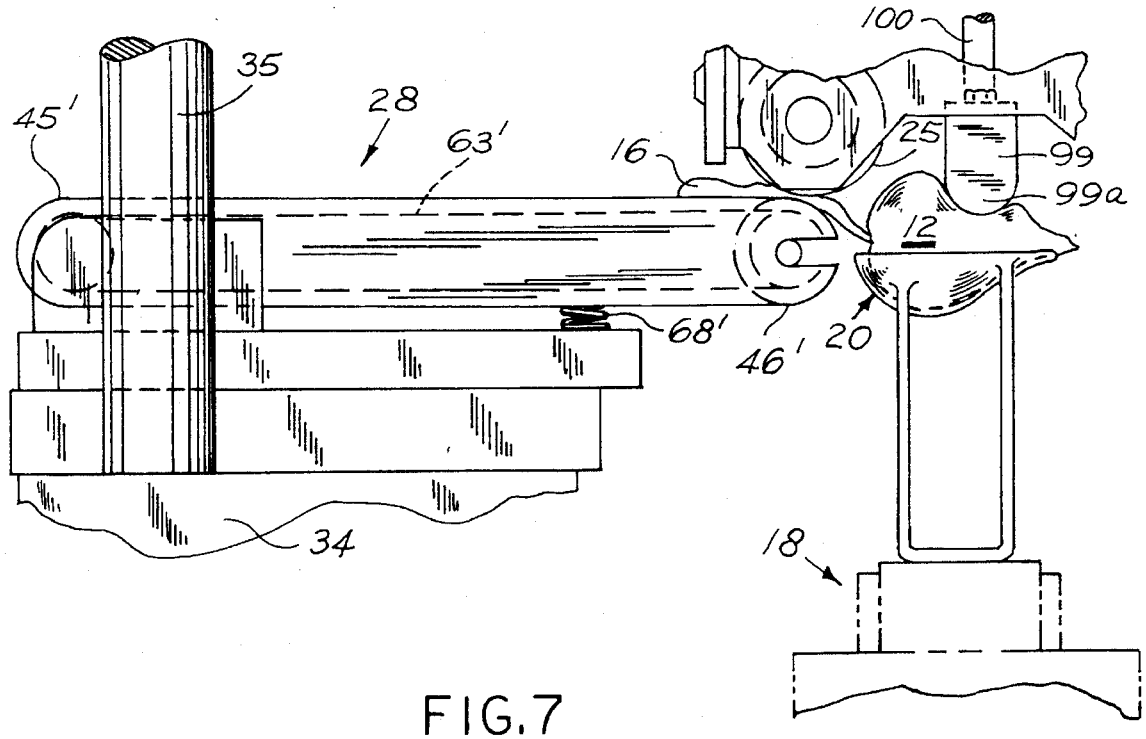
FIG. 7 is a view similar to FIG. 5, but showing the other conveyor assembly in operative relation with its associated pinch roller which is shown in FIG. 6.
Figure 8:
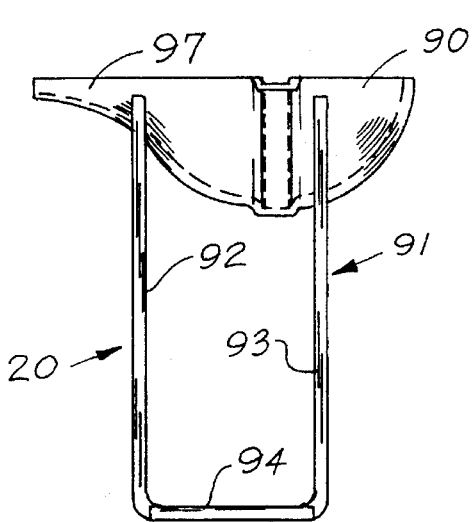
FIG. 8 is a rear elevation view of the part support.

Referring to FIGS. 1, 5 and 7, the part holder 29, which maintains the part 12 firmly in place in the support cup 90 during the deflashing operation, includes a cylindrical head 99 with a spherical shaped tip 99a. The head 99 is mounted on a shaft 100 which is movable vertically between an idle or at rest position shown in FIG. 1 and an extended or operated position, as illustrated in FIGS. 5 and 7, for example.

The shaft 100 is operated between the extended and retracted positions by an air cylinder 102 which is secured to the interior of the fixture 30. The air cylinder is operated by a limit switch 104 which is mounted on the frame (not shown) of the apparatus in operative relation with the movable platen 36. The limit switch 104 is engaged by and operated by the platen 36 as it is raised by the motive means to lift the conveyor assemblies. The air cylinder operation is synchronized with the raising of the conveyor assemblies, ensuring that the shaft 98 is extended to move the head 99 into engagement with the part 12, as the conveyor assemblies are being raised, but before the movable ends of the conveyor assemblies engage the part 12. The limit switch 104 is operated to a released condition, enabling the shaft to be retracted as the platen is lowered by the motive means to return the conveyor assembly 27 to its at rest position.

In operation of the part deflashing apparatus 10, with reference to FIGS. 1, 5 and 7, when a part 12 to be deflashed is positioned beneath the pinch rollers by the transport mechanism 18 positions, the motive means moves the movable platen 36, initially lifting the conveyor assemblies 27 and 28 vertically upward toward their operative relation with the pinch rollers 24 and 25. During its upward travel, the platen 36 engages and operates the limit switch 104. When limit switch 104 is operated, the air cylinder 102 is operated to extend the shaft 100, moving the head 99 downwardly into engagement with the upper portion of the part 12 to hold the part firmly in the support 20. Because the part 12 is flexible, it deforms slightly when engaged by the shaft as shown in FIGS. 5 and 7. The lower portion of the part conforms to the shape of the support.

The movable platen 36, which is being moved by the motive means 77, simultaneously lifts both of the conveyor assemblies 27 and 28 vertically upward into engagement with the flash at both ends 15 and 17 of the part 12, driving the flash 14 and 16 into engagement with the pinch rollers 24 and 25. The vertical distance that the conveyor assemblies travel is on the order of six inches. Initially, the movable ends of the conveyor assemblies engage the flash, as is shown in FIG. 5 for conveyor assembly 27. The grooved pinch roller 24 straddles the nozzle 12b of the part.

With continued lifting of the conveyor assemblies, the respective movable ends 45 and 45' of the conveyor assemblies are pivoted about their fixed ends and against the force of the compression springs as shown in FIG. 7 for conveyor assembly 27. The compression springs provide sufficient force to pinch the flash between the movable ends of the conveyor assemblies and the rotating pinch rollers, causing the flash to be pulled off the part 12 by the rotating pinch rollers. The flash which is removed from the part is carried away by the conveyor belts 63 and 63' of the conveyor assemblies which are driven by the pinch rollers when the conveyor belts 63 engage the pinch rollers, both through the flash as it is being removed and directly after the flash has been pulled off the part during the deflashing operation. The scrap or flash is moved along a path of travel that is normal to the path of travel of the parts through the deflashing apparatus 10. The conveyor assemblies are lowered by the movable support under the control of the motive means. The tip of the part holder 29 is maintained in contact with the now deflashed part until the conveyor assemblies are lowered sufficiently to operate the limit switch 104 to its released condition. The air cylinder 102 is deenergized when the limit switch is operated to its released condition, permitting the shaft 100 to retract to its at rest position.

The part deflashing apparatus provided by the present invention is adapted for use in continuous feed processes and is used in combination with means for transporting molded parts from a blow molding apparatus (not shown) to the deflashing apparatus. The extending and retracting of the part holder is synchronized with the raising and lowering of the conveyor assemblies and both of these operations are synchronized with the operation of the part transport mechanism so that the conveyor assemblies are raised as soon as a part to be deflashed is positioned beneath and in alignment with the pinch rollers and lowered as soon as the flash has been pulled from the part. Typically, the complete deflashing cycle takes about 1 to 2 seconds once the part is in position beneath the pinch rollers, and the conveyor assemblies are raised and then lowered relative to the part in a substantially continuous vertical up and down motion. The part feed is continuous, but the transport mechanism 18 operates on a "stop and start" basis, monetarily stopping each part 12 in position beneath the pinch rollers for the duration of the operating cycle of the deflashing apparatus and then advancing the deflashed part past the deflashing apparatus while moving another part into position to be deflashed.

Thus, it can be seen that the present invention provides a part deflashing apparatus for removing flash from molded parts or articles. The part deflashing apparatus is particularly suited for deflashing flexible parts or parts or articles which are made of a thin material or parts, which parts are difficult to hold because of their flexibility and which tend to flex or collapse inwardly when engaged by a deflashing blade or mechanism. The deflashing apparatus includes a pair of pinch rollers which have knurled surface portions and which are rotated in opposite directions and in a direction away from the part being deflashed. The part being deflashed is positioned in underlying relation with the pinch rollers and the flash is moved into engagement with the rotating pinch rollers by a pair of free moving conveyor assemblies which are located at opposite ends of the part being deflashed. The flash which is removed from the part is carried away by the conveyor assemblies which are driven by the pinch rollers when the conveyor assemblies engage the pinch rollers during the deflashing operation. Although the part deflashing apparatus has been described with reference to a continuous feed process including means for transporting molded parts from a molding apparatus to the deflashing apparatus, it is apparent that with suitable modifications, the part deflashing apparatus could be adapted for manual feed operations. In addition, although the part deflashing apparatus has been described with reference to an application for deflashing a blow molded part, such as a bulb syringe, the apparatus can be used for removing flash from parts made by other molding processes and can remove flash from parts of various shapes and sizes. Other changes and modifications are possible without departing from the spirit and scope of the invention as defined by the following claims

We claim:

1. Apparatus for removing flash from a molded article or part comprising:

pinch roller means including first and second pinch rollers each having a knurled outer gripping surface; said pinch rollers being located at opposing first and second ends of said part, drive means for rotating said first and second pinch rollers in opposite directions;

part support means for supporting said part adjacent to said pinch rollers;

part holding means adapted to be moved into engagement with said part and cooperating with said part support means to hold said part firmly fixed in said part support means;

first conveyor means adapted to move a first portion of the flash at said first end of said part into engagement with said outer surface of said first pinch roller and second conveyor means adapted to move a second portion of the flash at said second end of said part into engagement with said outer surface of said second pinch roller;

motive means for moving said first and second conveyor means into engagement with said first and second portions of the flash at said first and second opposing ends of said part for pressing said first and second portions of the flash against said outer gripping surfaces of said first and second rotating pinch rollers while said part is held fixed in said part support means by said part holding means, to thereby prevent said part from moving relative to said pinch rollers when the flash is pressed against said pinch roller, said first and second pinch rollers cooperating with said first and second conveyor means, respectively, to pull the flash from said part, and said first and second conveyor means being adapted to convey the flash removed from said part away from said part;

and said first and second pinch rollers being located above said part support means and said first and second conveyor means being located below said part support means.

2. The apparatus according to claim 1, wherein said first and second conveyor means each have a fixed end pivotally mounted relative to said motive means and a movable end adapted to engage the flash, said motive means being adapted to lift said first and second conveyor means vertically upward, moving said movable ends of said first and second conveyor means into engagement with the flash and to lower said first and second conveyor means vertically downward after the flash has been removed from said part.

3. The apparatus according to claim 2, wherein said first and second conveyor means each include spring bias means for biasing said movable ends of said first and second conveyor means upwardly while permitting said movable ends of said first and second conveyor means to be deflected downwardly when the flash is moved into engagement with said outer surfaces of said pinch rollers.

4. The apparatus according to claim 1, wherein said part holding means includes a holder and means for moving said holder vertically relative to said part support means to engage said part and to urge said part into firm engagement with said part support means.

5. The apparatus according to claim 4, wherein said part support means includes a shallow cup portion the shape of which substantially conforms to the shape of said part, said cup portion supporting said part with at least a portion of the flash extending beyond said cup portion.

6. Apparatus for removing flash from first and second opposing ends of a flexible molded part comprising:

pinch roller means including first and second pinch rollers having outer gripping surfaces;

part support means for supporting said part with at least a portion of the flash extending beyond the part support means at said first and second ends of said part, and with said first and second ends of said part located adjacent to said first and second pinch rollers, respectively;

drive means for rotating said first and second pinch rollers in opposite directions;

bias means for pressing first and second portions of the flash against said outer surfaces of said first and second rotating pinch rollers, respectively, while said first and second pinch rollers are being rotated in said opposite directions, whereby the flash is pinched between said pinch rollers and said bias means and pulled from said part as said first and second pinch rollers are rotated by the drive means;

said bias means comprising first conveyor means that is moved into engagement with said first portion of the flash for pressing said first portion of the flash against said outer surface of said first pinch roller, and second conveyor means that is moved into engagement with said second portion of the flash for pressing said first portion of the flash against said outer surface of said second pinch roller, said first and second pinch rollers cooperating with said first and second conveyor means, respectively, to pull the flash from said part, and said first and second conveyor means being adapted to convey the flash removed from said part away from said part;

said first and second pinch rollers being located above said part support means and said first and second conveyor means being located below said part support means, and lifting means for lifting said first and second conveyor means relative to said first and second pinch rollers, said first and second conveyor means each having a fixed end pivotally mounted relative to said lifting means and a movable end adapted to engage the flash, said lifting means being adapted to lift said first and second conveyor means vertically upward to move said movable ends of said first and second conveyor means into engagement with the flash.

7. The apparatus according to claim 6, including part holding means adapted to be moved into engagement with said part to hold said part firmly fixed in said part support means, said part holding means being moved into engagement with said part prior to said first and second conveyor means being moved into engagement with said first and second portions of the flash to prevent said part from moving relative to said pinch roller when said first portion of the flash is pinched between said first conveyor means and said first pinch roller, and said second portion of the flash is pinched between said second conveyor means and said second pinch roller, and said part holding means being moved out of engagement with said part after the removed flash is conveyed away from the part by the first and second conveyor means.

8. The apparatus according to claim 7, including means operated in response to said lifting means lifting said first and second conveyor means for causing said part holding means to be moved into engagement with said part before said first and second conveyor means are moved into engagement with the flash.

* * * * *